United States Patent [19]

Chopra et al.

[11] Patent Number: 5,768,678
[45] Date of Patent: Jun. 16, 1998

[54] MANGANESE SULFIDE COMPOSITION AND ITS METHOD OF PRODUCTION

[75] Inventors: Kuldip Chopra, Grand Island; Stephen F. Claeys, Niagara Falls; G. Russell Lewis, Grand Island; Ralph A. Casciani, Lewiston, all of N.Y.

[73] Assignee: Pyron Corporation, Niagara Falls, N.Y.

[21] Appl. No.: 646,769

[22] Filed: May 8, 1996

[51] Int. Cl.$^6$ ................................................ B22F 3/12
[52] U.S. Cl. .............................. 419/37; 419/28; 419/38; 423/511
[58] Field of Search .................... 419/37, 38, 28; 75/231; 423/566.1, 511

[56] References Cited

U.S. PATENT DOCUMENTS

| | | | |
|---|---|---|---|
| 2,770,527 | 11/1956 | Alderson et al. | 423/511 |
| 3,705,020 | 12/1972 | Nachtman | 75/231 |
| 3,956,146 | 5/1976 | Tsuya et al. | 75/231 |
| 4,676,970 | 6/1987 | Todd et al. | 423/561 |

OTHER PUBLICATIONS

Improvement of Machinability in PM Parts Using Manganese Sulfide; K.S. Chopra; pp. 501–510; vol. 43; Progress in Powder Metallurgy.

*Primary Examiner*—Ngoclan Mai
*Attorney, Agent, or Firm*—Hodgson, Russ, Andrews, Woods & Goodyear

[57] ABSTRACT

Disclosed is a metal sulfide composition for use as a machining aid comprising 55.0% to 65.0% by weight of manganese, 29.0% to 36.0% by weight of sulfur, and greater than 2.0% to 10% by weight of iron. Also disclosed is a method of making the metal sulfide composition comprising mixing manganese, sulfur, and iron; initiating an exothermic reaction between the manganese and sulfur, wherein the iron component moderates and cools the exothermic reaction; forming a solid mass of manganese sulfide composition containing a portion of the iron suspended therein; and recovering the solid manganese sulfide composition. A method of using the manganese sulfide composition according to the present invention as a machining aid comprises mixing into a blend a desired metal powder with the manganese sulfide composition; spreading the blend into a metal part die; compacting the blend into the die; sintering the compacted part; and machining the sintered part.

35 Claims, 2 Drawing Sheets

MANGANESE SULFIDE COMPOSITION AND ITS METHOD OF PRODUCTION

FIELD OF THE INVENTION

The present invention relates to an improved method for making a machinability enhancing additive comprising a manganese sulfide composition. The resulting composition is particularly suited as a machining aid for ferrous metal powder parts.

BACKGROUND OF THE INVENTION

1. Powder Metal and Machining Aids

Powder metals are used to fabricate small component parts including valve plates, pistons, thrust plates, rotors, gears, sprockets, bearings, magnetic components, and structural parts. The processes used to manufacture such component parts includes metal-injection molding, high-density processing, and powder metal forging. While the parts are made close to final form, they often require further machining. Machining of the parts may be required to achieve the desired dimensions or surface finish, or to alter the part for its intended function such as by threading, tapping, boring, and drilling.

The machinability of a powder metal part is generally understood to mean the relative ease or difficulty which the metal comprising the part can be machined to its final desired specifications. Machinability of a metal depends on such factors as density, hardness, porosity, composition, and microstructure. To enhance machinability of powder metal parts, a machinability enhancing additive or "machining aid" is added to the powder metal in the manufacturing process which acts as a lubricant to reduce friction and wear on the tools used in the machining process. Extending tool life reduces the cost of processing powder metal parts.

One such machining aid consists of manganese sulfide (MnS). In a typical manufacturing process, the metal powder is blended with MnS in a range of from about 0.2% to about 2%. The blended powder is then compacted in a die formed for the part using a press, and the compacted part is passed through a sintering furnace. MnS as a component of the blended powder has been shown not to have any appreciable detrimental effect on the sintering process, nor the mechanical properties of the sintered parts (Chopra, 1987, *Progress in Powder Metallurgy* 43:501-510). In terms of usage, the largest category of powder metal materials comprises ferrous-containing alloys such as iron and steel alloys. Thus, there is a need for a machining aid particularly suited for enhancing the machinability of ferrous metal powder parts.

2. Prior Art

U.S. Pat. No. 4,676,970, to Todd et al., discloses a method for producing a metal sulfide such as MnS. The process involves an extremely exothermic, and potentially violent, reaction in which manganese and sulfur are fused under intense reaction temperatures. The manganese sulfide is recovered and a portion is recycled back into the initial mixing step of more manganese and sulfur in efforts to cool and control a subsequent reaction. As much as 40% of the manganese sulfide produced must be recycled into the main reaction. The necessity to recycle a significant portion of the yield of metal sulfide back into a reaction has the disadvantage of reducing the yield of metal sulfide from each reaction. Thus, there is a need for a process of making manganese sulfide in which the yield is improved, such as by obviating the need to recycle the desired product back into a main reaction.

SUMMARY OF THE INVENTION

One important aspect of the present invention is to provide a method for making a manganese sulfide machining aid containing a small amount of iron (preferably ranging between 2-8% by weight) without the need to recycle a significant portion of the manganese sulfide machining aid produced back into the initial mixing process for a subsequent reaction.

Another important aspect of the invention is to provide for a mechanism to moderate and cool the highly exothermic reaction between manganese and sulfur in producing a manganese sulfide composition.

A further aspect of the present invention is to provide a machining aid particularly suited for enhancing the machinability of ferrous metal powder parts.

DETAILED DESCRIPTION

Figure 1:
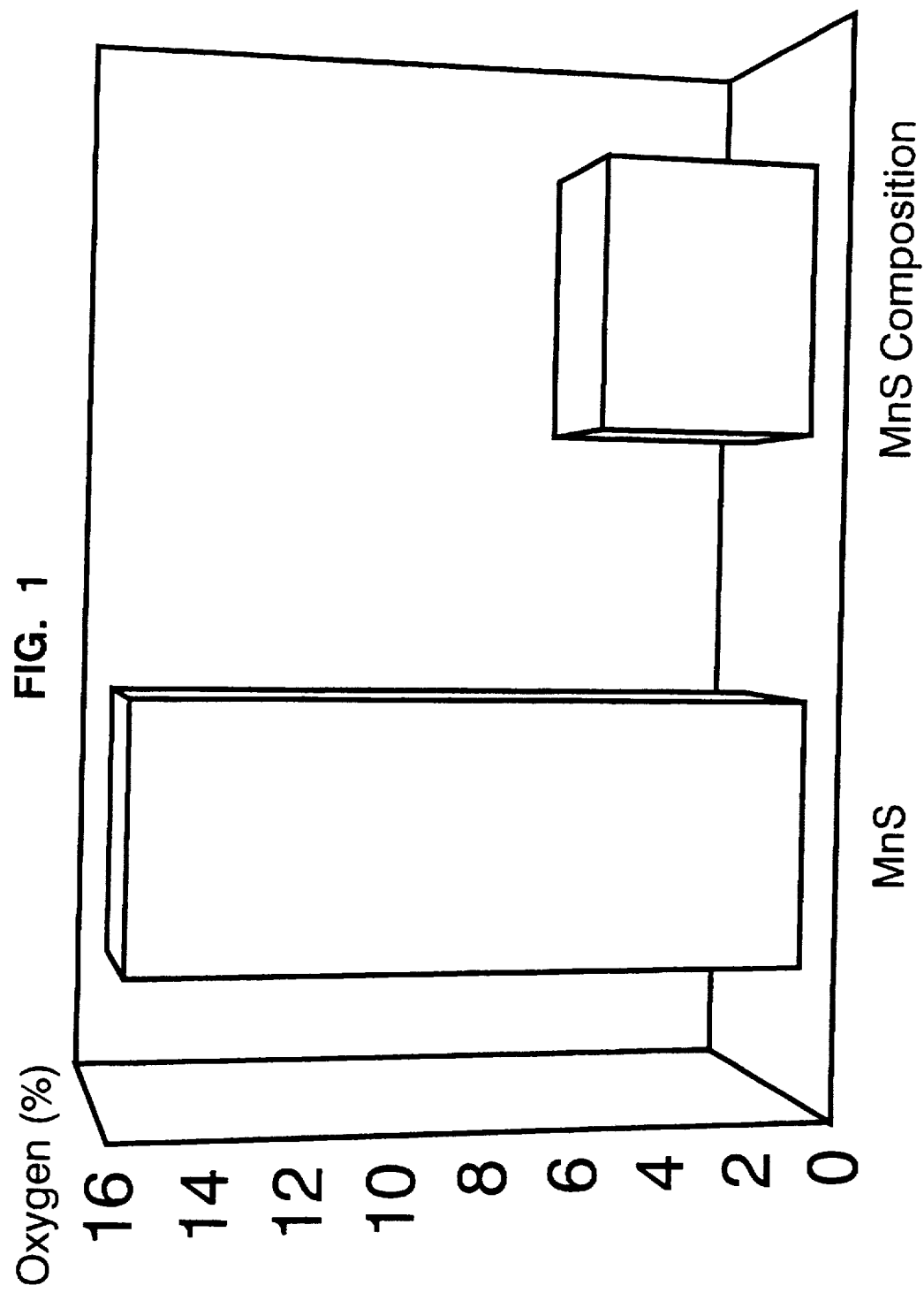
FIG. 1 is a graphic representation of the resistance of the MnS composition according to the present invention, as compared to that of MnS, to oxidation due to moisture.

A method has been developed which produces a fused MnS composition. The method of the present invention not only provides a mechanism to moderate and cool the highly exothermic reaction between manganese and sulfur, but also controls such reaction without the need for recycling a significant amount of MnS back into the main reaction. This method can be practiced using equipment conventional to the powder metallurgy industry.

In the method of the present invention for producing MnS, manganese and sulfur are co-fused in the presence of iron. These reaction ingredients are in particle form of "high purity" as defined in the powder metallurgy industry. Typical for this reaction, manganese powder, ground and/or flaked sulfur, and iron powder are mixed together by blending means known to the powder metallurgy industry. For purposes of illustration and not limitation, suitable manganese powder may range in particle size of from about 30 to about 180 microns; iron powder may range in particle size of from about 20 microns to about 2 mm; ground sulfur may range in particle size of from about 10 to about 150 microns; and flaked sulfur may range in particle size of from about 0.5 to about 10 mm. However, those skilled in the art, would appreciate that the particle sizes of the ingredients may be varied depending on the desired reaction rate, and rate of cooling.

A range of weight percentage for each of manganese, sulfur, and iron added to each blend in the method of the present invention to make the MnS composition is illustrated in Table 1.

TABLE 1

| Component | Weight Percentage |
| --- | --- |
| Manganese | 50.0 to 65.0 |
| Sulfur | 30.0 to 38.0 |
| Iron | 5 to 25 |

A preferred range for manganese in the blend used in the method of the present invention is from about 50% to about 54% by weight. A preferred range for sulfur in the blend used in the method of the present invention is from about 30% to about 35% by weight. A preferred range for iron in the blend used in the method of the present invention is from about 10% to about 20% by weight. As appreciated by those skilled in the art, the weight percentage of each ingredient in the initial blend may be varied depending on factors related to the process and final product. For example, and as related to the process, the weight percentage of each ingredient in the initial blend may be varied depending on the desired rate of cooling and control of the reaction, and to regulate the amount of sulfur fumes expelled from the reaction. For example, and as related to the product, the weight percentage of each ingredient in the initial blend may be varied depending on the desired machining properties of the resultant MnS composition, and the desired structural characteristics of the powder metal part into which it is incorporated.

Following blending of the ingredients, the blend is loaded into a reaction vessel. The reaction vessel can be made from materials used for reaction vessels which are conventional to the chemical process industry. However, in a preferred embodiment, the reaction vessel comprises a cast iron pot which is of a size optimal for the amount of initial blend added, and for the solidification pattern of the MnS composition such that some of the iron precipitates out, as well dispersed droplets, from the molten MnS composition. In this preferred embodiment, a relatively small but heavy cast iron pot is used to provide a large surface area to volume ratio for efficient removal of heat from the highly exothermic reaction between manganese and sulfur. A lid can be placed on the pot and then sealed around its circumference to prevent air leakage inward in minimizing the amount of oxidation of the MnS composition produced. A small opening, which may be manually or automatically opened or closed, may be included in the means used to seal the pot, wherein the small opening may be used to vent excess sulfur fumes generated by the reaction.

Having added the blend to the reaction vessel, and having a means to seal the vessel, it is desirable to provide a means for initiating the reaction. Any means for initiating such a reaction which are conventional to the chemical process industry may be used with the method of the present invention. For example, a lit igniter fuse may be used to initiate the reaction by introducing the igniter fuse into the reaction vessel through the small opening in the means used to seal the vessel. The initiated reaction between manganese and sulfur rapidly accelerates to form a pool of molten MnS composition. The reaction continues as the pool envelops remaining solid ingredients of the blend, and heat is generated. It is an unexpected result that the presence of iron powder in the initial blend moderates and cools the process. Further, the iron primarily remains unalloyed iron during the reaction and in the resulting composition. Thus, the iron powder in the initial blend provides a mechanism to moderate and cool the highly exothermic reaction between manganese and sulfur, but also controls such reaction without the need for recycling a significant amount of MnS back into the main reaction.

The reaction subsides as the manganese and sulfur are consumed in forming the MnS composition. Typically in the reaction, a small amount of the manganese may remain unreacted, and slowly drops below the pool of molten MnS composition in forming a slug or "button" on the bottom surface in the reaction vessel. Likewise, a significant portion of the iron drops below the pool of molten MnS composition in forming a slug or "button" on the bottom surface in the reaction vessel. As the pool of molten MnS cools in forming a mass of MnS composition, the solidification pattern can be regulated so that a desirable amount of iron remains suspended in the solidifying MnS in forming a mass of the MnS composition according to the present invention. The unalloyed iron is imbedded in the mass of solidified MnS composition. Upon milling, this iron remains in the resultant milled MnS composition.

After sufficient cooling to allow for the solidification of the MnS composition according to the present invention, the mass of MnS composition is removed from the reaction vessel and from the button remaining on the bottom surface in the reaction vessel. The button is easily removed from the bottom surface, and the reaction vessel may then be scraped clean and reloaded with blend in producing more MnS composition according to the method of the present invention. The mass of MnS composition is then further processed using methods which are conventional to the powder metallurgy industry for forming a powder of the MnS composition suitable for use as a machining aid. Typically, the MnS is broken down into chunks of about 1 inch or smaller, and the chunks are then placed in a jaw crusher which reduces the size of the chunks to about ¼ to about ½ inch. The chunks are then milled to particles of a size of about 75 microns. These particles can then be further milled which reduces the MnS composition product to a median size of about 5–10 microns. Depending on the desired size specifications for this product, it can be further purified by removing any particles over 20 microns.

The MnS composition resulting from the method according to the present invention has a chemical composition of manganese, sulfur, an iron in a preferred range of weight percentage illustrated in Table 2.

TABLE 2

| Analyte in MnS composition | Weight Percentage |
|---|---|
| Manganese | 55.0 to 65.0 |
| Sulfur | 29.0 to 36.0 |
| Iron | >2.0 to 8.0 |

A most preferred range for manganese in the MnS composition produced according to the method of the present invention is from about 60% to about 62% by weight. A most preferred range for sulfur in the MnS composition produced according to the method of the present invention is from about 30% to about 32% by weight. A most preferred range for iron in the MnS composition produced according to the method of the present invention is from greater than 2% to about 8% by weight. As appreciated by those skilled in the art, the weight percentage of each ingredient in the MnS composition according to the present invention may be varied depending on the desired machining properties of the resultant MnS composition, and the desired structural characteristics of the powder metal part into which it is incorporated. The iron concentration of the MnS composition may also be controlled in a milling process used to attain certain classifications for the final product.

The MnS composition according to the present invention has the following advantages. The yield of product is improved as it can be made according to the method of the present invention which does not require recycling a significant amount of MnS back into the main reaction. Further, the iron present in the MnS composition according to the present invention is in an unoxidized form. With the result of an unoxidized iron surface in the presence of manganese sulfide particles, an improved microstructure is formed which, upon sintering of powder metal part in the presence of this machining aid, enhances machinability of the powder metal part. Particularly, the presence of iron in the MnS composition of the present invention at a concentration of greater than 2% by weight results in an improved machining aid for ferrous metal powder parts. An improved machining aid will extend the tool life in the primary and secondary operations in the powder metallurgy industry.

Another important function of the iron in the MnS composition according to the present invention is the protection the iron provides against oxidation by moisture. Typically, over time MnS will severely degrade, even in the presence of normal atmospheric moisture conditions such that it would detrimentally affect its ability to act as a machining aid. This is because in the presence of water, manganese sulfide forms manganese oxide in the reaction(s) which can be simplified as follows:

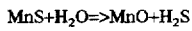

$MnS+H_2O \Rightarrow MnO+H_2S$

The MnO formed causes severe degradation of machinability, and cannot be reduced during normal sintering. However, in the MnS composition according to the present invention, unexpectedly there is reduced oxidation of MnS when exposed to moisture. The resistance of the MnS composition according to the present invention to oxidation due to moisture, as compared to that of the MnS presently used in the industry, is illustrated in FIG. 1. For the test conditions, 5 g samples of the MnS composition according to the present invention and MnS were exposed to water vapor at 77° F. in conditions of saturation for several days. Under such conditions, the MnS composition according to the present invention suffered only about one third of the amount of oxidation suffered by MnS.

Having described different embodiments of the present invention, the following examples are provided to illustrate specific applications of the invention but are not intended to limit the scope of the invention described in this application.

EXAMPLE 1

In one illustration of an embodiment of the composition and method according to the present invention, an initial blend of 100 pounds (lbs.) was formed by mixing together high purity manganese, sulfur and iron. The manganese powder comprised 56.7% by weight of the blend; sulfur comprised 36.9% by weight of the blend; and iron powder comprised 6.4% by weight of the blend. The sulfur was added in a form consisting of a flaked sulfur to ground sulfur ratio of 60:40. Following blending of the ingredients, the blend is loaded into a reaction vessel comprising an 8.5 cubic foot, 4,500 lb. cast iron pot. The pot was be sealed around its circumference to prevent air leakage inward, but had a 5 inch diameter hole in the center of the lid through which was vented excess sulfur fumes generated by the reaction.

A lit igniter fuse was dropped into the reaction vessel through the small opening, in initiating the reaction in the means used to seal the vessel. The initiated reaction between manganese and sulfur continued for several minutes as a pool of molten MnS composition formed. The iron powder in the initial blend provided a mechanism to moderate and cool the highly exothermic reaction between manganese and sulfur. As the reaction subsided, care was taken to cover the small opening to minimize oxidation of the resultant product. The MnS composition and the pot were cooled for a period of at least 12-15 hours. After cooling, the pot (mounted on a tilt-cradle) was tipped, and the mass of MnS composition was removed and processed into its final particulate form by crushing and milling. The iron button, comprising about half of the iron initially added, was easily removed from the bottom surface of the pot.

EXAMPLE 2

In another illustration of an embodiment of the composition and method according to the present invention, and following the procedures according to Example 1, an initial blend of 300 lbs. was formed by mixing together high purity manganese, sulfur and iron. The manganese powder comprised 56% by weight of the blend; sulfur comprised 37% by weight of the blend; and iron powder comprised 7% by weight of the blend. The sulfur was added in a form consisting of a flaked sulfur to ground sulfur ratio of 65:35. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 3

In another illustration of an embodiment of the composition and method according to the present invention, and following the procedures according to Example 1, an initial blend of 500 lbs. was formed by mixing together high purity manganese, sulfur and iron. The manganese powder comprised 56% by weight of the blend; sulfur comprised 37% by weight of the blend; and iron powder comprised 7% by weight of the blend. The sulfur was added in a form consisting of a flaked sulfur to ground sulfur ratio of 65:35. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 56.63% by weight; sulfur was present at a concentration of 33.81% by weight; and iron was present at a concentration of 9.11% by weight. The MnS composition was then processed into its final particulate form by crushing and milling. The iron button, present the bottom surface of the pot, was easily removed from the pot.

EXAMPLE 4

In another illustration of an embodiment of the composition and method according to the present invention, and following the procedures according to Example 1, an initial blend of 590 lbs. was formed by mixing together high purity manganese, sulfur and iron. The manganese powder comprised 57.5% by weight of the blend; and sulfur comprised 35.7% by weight of the blend, including extra sulfur of 0.5% by weight which was added at the same time as the other ingredients to form the blend. The total sulfur added was in a form consisting of a flaked sulfur to ground sulfur ratio of 31.2:68.8. Iron powder comprised 6.8% by weight of the blend. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 5

In another illustration of an embodiment of the composition and method according to the present invention, and following the procedures according to Example 1, an initial blend of 500 lbs. was formed by mixing together high purity manganese, sulfur and iron. The manganese powder comprised 56.5% by weight of the blend; and sulfur comprised 37.2% by weight of the blend, including extra sulfur of 5% by weight which was added at the same time as the other ingredients to form the blend. The total sulfur added was in a form consisting of a flaked sulfur to ground sulfur ratio of 80:20. Iron powder comprised 6.4% by weight of the blend. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 6

In another illustration of an embodiment of the composition and method according to the present invention, and following the procedures according to Example 1, an initial blend of 500 lbs. was formed by mixing together high purity manganese, sulfur and iron. The manganese powder comprised 56.6% by weight of the blend; and sulfur comprised 37.3% by weight of the blend, including extra sulfur of 5% by weight which was added at the same time as the other ingredients to form the blend. The total sulfur added was in a form consisting of a flaked sulfur to ground sulfur ratio of 80:20. Iron powder comprised 6.1% by weight of the blend. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 7

In another illustration of an embodiment of the composition and method according to the present invention, and following the procedures according to Example 1, an initial blend of 600 lbs. was formed by mixing together high purity manganese, sulfur and iron. The manganese powder comprised 57% by weight of the blend; and sulfur comprised 36% by weight of the blend, including extra sulfur of 5% by weight which was added at the same time as the other ingredients to form the blend. The total sulfur added was in a form consisting of a flaked sulfur to ground sulfur ratio of 80:20. Iron powder comprised 7% by weight of the blend. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 59.17% by weight; sulfur was present at a concentration of 31.96% by weight; and iron was present at a concentration of 6.33% by weight. The MnS composition was then processed into its final particulate form by crushing and milling. The iron button, present the bottom surface of the pot, was easily removed from the pot.

EXAMPLE 8

In a further illustration of an embodiment of the composition and method according to the present invention, and following the procedures according to Example 1, an initial blend of 500 lbs. was formed by mixing together high purity manganese, sulfur and iron. The manganese powder comprised 57% by weight of the blend; and sulfur comprised 36% by weight of the blend, including extra sulfur of 5% by weight which was added at the same time as the other ingredients to form the blend. The total sulfur added was in a form consisting of a flaked sulfur to ground sulfur ratio of 80:20. Iron powder comprised 7% by weight of the blend. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 53.88% by weight; sulfur was present at a concentration of 34.8% by weight; and iron was present at a concentration of 9.18% by weight. The MnS composition was then processed into its final particulate form by crushing and milling. The iron button, present the bottom surface of the pot, was easily removed from the pot.

EXAMPLE 9

In a further illustration of an embodiment of the composition and method according to the present invention, and following the procedures according to Example 1, an initial blend of 500 lbs. was formed by mixing together high purity manganese, sulfur and iron. The manganese powder comprised 57% by weight of the blend; sulfur comprised 36% by weight of the blend; and iron powder comprised 7% by weight of the blend. The total sulfur added was in a form consisting of a flaked sulfur to ground sulfur ratio of 80:20. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 10

In a further illustration of an embodiment of the composition and method according to the present invention, and following the procedures according to Example 1, an initial blend of 500 lbs. was formed by mixing together high purity manganese, sulfur and iron. The manganese powder comprised 57% by weight of the blend; sulfur comprised 36% by weight of the blend; and iron powder comprised 7% by weight of the blend. The total sulfur added was in a form consisting of a flaked sulfur to ground sulfur ratio of 100:0. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 61.52% by weight; sulfur was present at a concentration of 33.52% by weight; and iron was present at a concentration of 4.01% by weight. The MnS composition was then processed into its final particulate form by crushing and milling. The iron button, present the bottom surface of the pot, was easily removed from the pot.

EXAMPLE 11

In a further illustration of an embodiment of the composition and method according to the present invention, and following the procedures according to Example 1, an initial blend of 400 lbs. was formed by mixing together high purity manganese, sulfur and iron. The manganese powder comprised 56.1% by weight of the blend; sulfur comprised 37.1% by weight of the blend; and iron powder comprised 6.3% by weight of the blend. The total sulfur added was in a form consisting of a flaked sulfur to ground sulfur ratio of 77:23. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 56.48% by weight; sulfur was present at a concentration of 35.16% by weight; and iron was present at a concentration of 7.25% by weight. The MnS composition was then processed into its final particulate form by crushing and milling. The iron button, present the bottom surface of the pot, was easily removed from the pot.

EXAMPLE 12

In a further illustration of an embodiment of the composition and method according to the present invention, and following the procedures according to Example 1, an initial blend of 450 lbs. was formed by mixing together high purity manganese, sulfur and iron. The manganese powder comprised 57% by weight of the blend; sulfur comprised 36% by weight of the blend; and iron powder comprised 7% by weight of the blend. The total sulfur added was in a form consisting of a flaked sulfur to ground sulfur ratio of 80:20. As consistently observed with the method according to the present invention, the iron powder in the initial blend provided a mechanism to moderate and cool the highly exothermic reaction between manganese and sulfur. The mass of MnS composition produced was removed and analyzed for its chemical composition. Manganese was present at a concentration of 57.15% by weight; sulfur was present at a concentration of 33.41% by weight; and iron was present at a concentration of 6.68% by weight. The MnS composition was then processed into its final particulate form by crushing and milling. The iron button, present the bottom surface of the pot, was easily removed from the pot.

EXAMPLE 13

In a yet another illustration of an embodiment of the composition and method according to the present invention, and following the procedures according to Example 1, an initial blend of 400 lbs. was formed by mixing together high purity manganese, sulfur and iron. The manganese powder comprised 57% by weight of the blend; sulfur comprised 36% by weight of the blend; and iron powder comprised 7% by weight of the blend. The total sulfur added was in a form consisting of a flaked sulfur to ground sulfur ratio of 80:20. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 14

In yet another illustration of an embodiment of the composition and method according to the present invention, and following the procedures according to Example 1, an initial blend of 472 lbs. was formed by mixing together high purity manganese, sulfur and iron. The manganese powder comprised 48.3% by weight of the blend; sulfur comprised 30.5% by weight of the blend; and iron powder comprised 21.2% by weight of the blend. The total sulfur added was in a form consisting of a flaked sulfur to ground sulfur ratio of 70:30. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 15

In yet another illustration of an embodiment of the composition and method according to the present invention, and following the procedures according to Example 1, an initial blend of 455 lbs. was formed by mixing together high purity manganese, sulfur and iron. The manganese powder comprised 50.4% by weight of the blend; sulfur comprised 31.9% by weight of the blend; and iron powder comprised 17.7% by weight of the blend. The total sulfur added was in a form consisting of a flaked sulfur to ground sulfur ratio of 70:30. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot.

EXAMPLE 16

In yet another illustration of an embodiment of the composition and method according to the present invention, and following the procedures according to Example 1, an initial blend of 489 lbs. was formed by mixing together high purity manganese, sulfur and iron. The manganese powder comprised 52.8% by weight of the blend; sulfur comprised 33% by weight of the blend; and iron powder comprised 13.9% by weight of the blend. The total sulfur added was in a form consisting of a flaked sulfur to ground sulfur ratio of 70:30. As consistently observed with the method according to the present invention, the iron powder in the initial blend provided a mechanism to moderate and cool the highly exothermic reaction between manganese and sulfur. The mass of MnS composition produced was removed. The iron button, present the bottom surface of the pot, was easily removed from the pot. Chemical analysis of the MnS composition made according to this example showed manganese in an amount of 58.9% by weight, sulfur in an amount of 33.9% by weight, iron in an amount of 6.5% by weight, and oxygen in an amount of 0.70% by weight.

EXAMPLE 17

Having disclosed and illustrated the improved method for making a machinability enhancing additive according to the present invention, it will be apparent to one skilled in the art that metal sulfide compositions, other than a manganese sulfide composition, can be manufactured resulting in machining aids for various metal powder parts. Metals which may be substituted for manganese in the method according to the present invention for making a metal sulfide composition include molybdenum, aluminum, vanadium, cobalt, chromium, nickel, zinc, and lead. In accordance with the method of the present invention, iron is used in the formation of these metal sulfides to moderate and cool an exothermic reaction which may occur when the metal fuses with sulfur.

EXAMPLE 18

The preceding Examples illustrate a MnS composition or other metal sulfide composition and a method of making the MnS or metal sulfide composition according to the present invention. Illustrated in this Example is a method of using the MnS composition produced according to the present invention as an improved machining aid.

In a typical manufacturing process, a metal powder is selected to fabricate powder metal parts. There are various metal powder materials used in the fabrication of powder metal parts which can be used in conjunction with the MnS composition according to the present invention including stainless steel alloys, steel alloys such as pure iron material, ferrous alloys, and plain carbon steels. A desired metal powder is blended with the MnS composition produced according to the present invention. The amount of MnS composition blended with the metal powder material depends on the composition of the metal powder material, the part to be fabricated, and the amount of machining it must undergo. Typically, the MnS composition may be added in a weight percentage of from about 0.2% to about 2%.

Depending on the metal powder material, other additives may be included in the blend such as lubricants, binder, a sintering enhancing additive, or a combination thereof, known in the powder metallurgy industry. The blended powder may then be spread evenly into a die shaped for the part to be fabricated; compacted using a press; and the compacted part is then passed through a sintering furnace to increase metallurgical strength. The sintered part is cooled and then ready for finishing such as by machining. The MnS composition according to the present invention is particularly suited for enhancing the machinability of ferrous metal powder parts.

Figure 2:
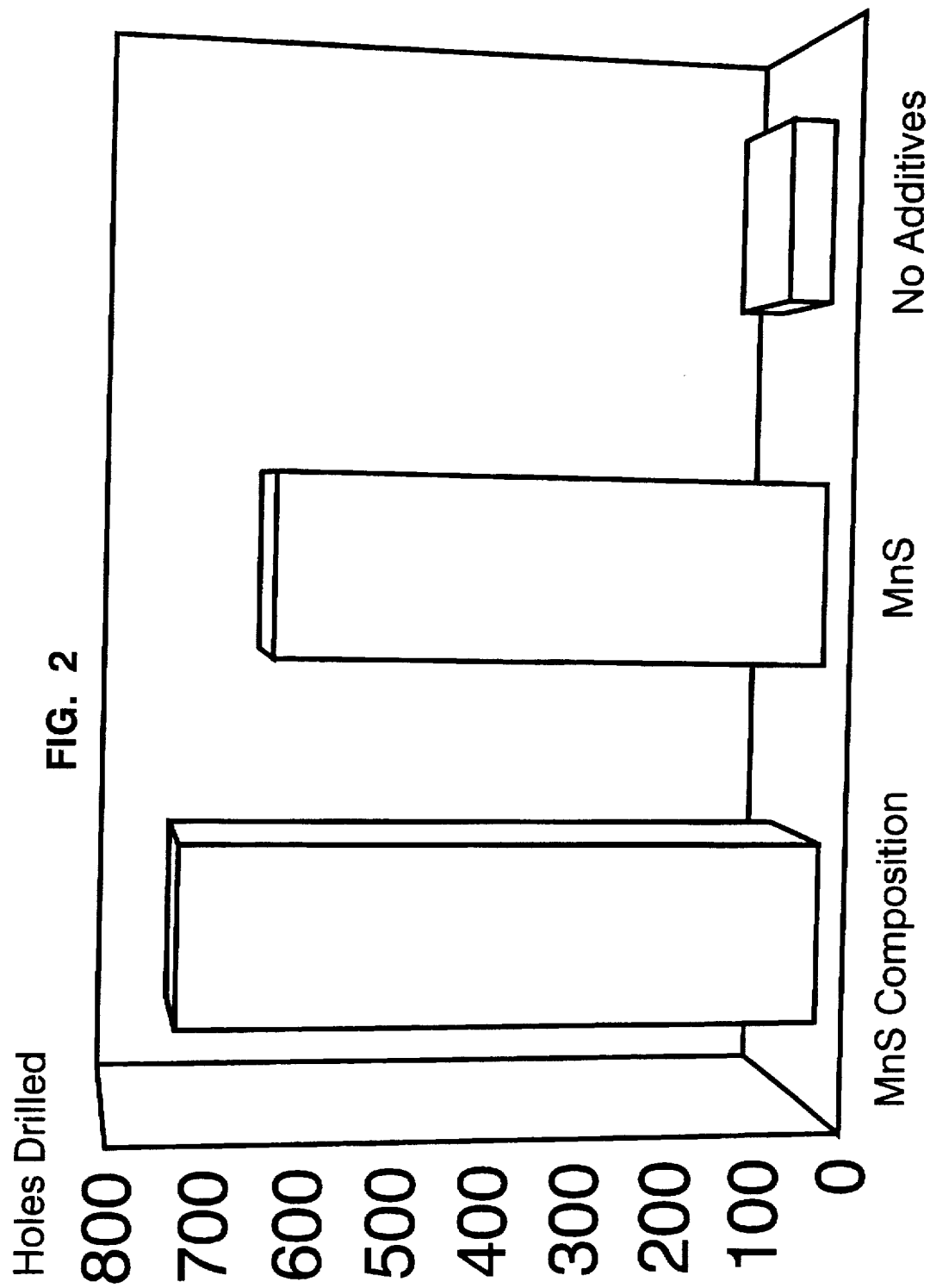
FIG. 2 is a graphic representation of the improvement in machinability when the MnS composition according to the present invention is used as a machining additive, as compared to use of the MnS as an additive or without an additive.

The MnS composition according to the present invention and MnS of the type typically used in the industry were compared for their effect on machinability of a ferrous metal powder part. Machinability was measured by monitoring the number of holes drilled ("number of drillings") until the drill bill fractures due to wear ("drill failure"). Such machinability can be monitored by a programmed, computerized machine. Using the manufacturing process as described above, one part of 6.8 g/cc density, and 1 inch thick was manufactured using a powder metal blend comprising 96.35% by weight iron, 2% by weight copper powder, 0.9% by weight graphite powder, and 0.75% by weight lubricant; and using a machining additive comprising 0.5% by weight of MnS. Using the same process, an identical part was made except that the machining additive was 0.5% by weight of the MnS composition according to the present invention. Each part was sintered for 30 minutes at 2050° F. Each part was then machined by repeated drilling 0.45 inches deep into the part using a No. 28 jobber drill bits (No. 28 size, black oxide-coated carbon steel bits) at 3,000 rpm with a 40 cm/min feed. The number of drillings until drill failure was monitored. The improvement in machinability due to the MnS composition according to the present invention, as compared to that of the MnS presently used in the industry, is illustrated in FIG. 2. Under such conditions, addition of the MnS composition according to the present invention resulted in improved machinability, as measured by an increased number of drillings before drill failure, as compared to MnS.

From the foregoing description, one skilled in the art of powder metallurgy will be capable of producing a MnS composition in a high yield with a mechanism to moderate and cool the highly exothermic reaction between manganese and sulfur without having to recycle a significant amount of MnS back into the main reaction. Obvious modifications and variations, such as substitution of equivalents, will be apparent to one skilled in the art from the foregoing description, and such are considered with the scope of the claimed invention.

What is claimed is:

1. A method for making a machining aid comprising a manganese sulfide composition, said method comprising:
   (a) mixing into a blend components comprising a manganese powder, a sulfur selected from the group consisting of a ground sulfur, a flaked sulfur, and a combination thereof, and an iron powder;
   (b) initiating an exothermic reaction between the manganese and sulfur such that a pool of molten manganese sulfide forms, wherein the iron component moderates and cools the exothermic reaction between manganese and sulfur;
   (c) cooling the reaction in forming a solid mass of manganese sulfide composition comprising manganese sulfide and a portion of the iron suspended in the solid mass; and
   (d) recovering the solid mass comprising the manganese sulfide composition.

2. The method according to claim 1, wherein the blend comprises manganese in a range of from 50.0% to 65.0% by weight; sulfur in a range of from 30.0% to 38.0% by weight; and iron in a range of from 5% to 25% by weight.

3. The method according to claim 2, wherein the blend comprises manganese in a range of from about 50% to about 54% by weight; sulfur in a range of from about 30% to about 35% by weight; and iron in a range of from about 10% to about 20% by weight.

4. The method according to claim 1, wherein the manganese powder ranges in particle size of from about 30 to about 180 microns.

5. The method according to claim 1, wherein the iron powder ranges in particle size of from about 20 to about 200 microns.

6. The method according to claim 1, wherein the ground sulfur ranges in particle size of from about 10 to about 150 microns.

7. The method according to claim 1, wherein the flaked sulfur ranges in particle size of from about 0.5 to about 10 mm.

8. The method according to claim 1, wherein the reaction takes place in a cast iron pot.

9. A method for making a machining aid comprising a metal sulfide composition, said method comprising:
   (a) mixing into a blend components comprising a metal powder ranging in particle size of from about 30 to about 180 microns and wherein the metal is selected from the group consisting of manganese, molybdenum, aluminum, vanadium, cobalt, chromium, nickel, zinc, and lead, a sulfur selected from the group consisting of a ground sulfur ranging in particle size of from about 10 to about 150 microns, a flaked sulfur ranging in particle size of from about 0.5 to about 10 mm, and a combination of ground sulfur and flaked sulfur, and an iron powder ranging in particle size of from about 20 to about 200 microns, wherein the blend comprises the metal in a range of from 50.0% to 65.0% by weight; sulfur in a range of from 30.0% to 38.0% by weight; and iron in a range of from 5% to 25% by weight;
   (b) initiating an exothermic reaction between the metal and sulfur such that a pool of molten metal sulfide forms, wherein the iron component moderates and cools the exothermic reaction between the metal and sulfur;

(c) cooling the reaction in forming a solid mass of metal sulfide composition comprising metal sulfide and a portion of the iron suspended in the solid mass; and (d) recovering the solid mass comprising the metal sulfide composition.

10. The method according to claim 9, wherein the metal is manganese, and the blend comprises manganese in a range of from about 50% to about 54% by weight; sulfur in a range of from about 30% to about 35% by weight; and iron in a range of from about 10% to about 20% by weight.

11. The method according to claim 9, wherein the reaction takes place in a cast iron pot.

12. A manganese sulfide composition made according to the method of claim 1, wherein the composition comprises 55.0% to 65.0% by weight of manganese, 29.0% to 36.0% by weight of sulfur, and greater than 2.0% to 8% by weight of iron.

13. The manganese sulfide composition according to claim 12, wherein the composition comprises from about 60% to about 62% by weight of manganese, from about 30% to about 32% by weight of sulfur, and from about 4% to about 6% by weight of iron.

14. A manganese sulfide composition made according to the method of claim 3, wherein the composition comprises 55.0% to 65.0% by weight of manganese, 29.0% to 36.0% by weight of sulfur, and greater than 2.0% to 8% by weight of iron.

15. The manganese sulfide composition according to claim 14, wherein the composition comprises from about 60% to about 62% by weight of manganese, from about 30% to about 32% by weight of sulfur, and from about 4% to about 6% by weight of iron.

16. A metal sulfide composition made according to the method of claim 9, wherein the composition comprises 55.0% to 65.0% by weight of the metal, 29.0% to 36.0% by weight of sulfur, and greater than 2.0% to 8% by weight of iron.

17. The metal sulfide composition according to claim 16, wherein the composition comprises from about 60% to about 62% by weight of the metal, from about 30% to about 32% by weight of sulfur, and from about 4% to about 6% by weight of iron.

18. A method for using as a machining aid the manganese sulfide composition according to claim 12, said method comprises:

(a) mixing into a blend a desired metal powder with the manganese sulfide composition according to claim 12;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

19. The method according to claim 18, wherein the blend further comprises a lubricant, binder, a sintering enhancing additive, and a combination thereof.

20. The method according to claim 18, wherein the manganese sulfide composition is added in a weight percentage of from about 0.2% to about 2%.

21. A method for using as a machining aid the manganese sulfide composition according to claim 13, said method comprises:

(a) mixing into a blend a desired metal powder with the manganese sulfide composition according to claim 13;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

22. The method according to claim 21, wherein the blend further comprises a lubricant, binder, a sintering enhancing additive, and a combination thereof.

23. The method according to claim 21, wherein the manganese sulfide composition is added in a weight percentage of from about 0.2% to about 2%.

24. A method for using as a machining aid the manganese sulfide composition according to claim 14, said method comprises:

(a) mixing into a blend a desired metal powder with the manganese sulfide composition according to claim 14;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

25. The method according to claim 24, wherein the blend further comprises a lubricant, binder, a sintering enhancing additive, and a combination thereof.

26. The method according to claim 24, wherein the manganese sulfide composition is added in a weight percentage of from about 0.2% to about 2%.

27. A method for using as a machining aid the manganese sulfide composition according to claim 15, said method comprises:

(a) mixing into a blend a desired metal powder with the manganese sulfide composition according to claim 15;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

28. The method according to claim 27, wherein the blend further comprises a lubricant, binder, a sintering enhancing additive, and a combination thereof.

29. The method according to claim 27, wherein the manganese sulfide composition is added in a weight percentage of from about 0.2% to about 2%.

30. A method for using as a machining aid the metal sulfide composition according to claim 16, said method comprises:

(a) mixing into a blend a desired metal powder with the metal sulfide composition according to claim 16;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

31. The method according to claim 30, wherein the blend further comprises a lubricant, binder, a sintering enhancing additive, and a combination thereof.

32. The method according to claim 30, wherein the metal sulfide composition is added in a weight percentage of from about 0.2% to about 2%.

33. A method for using as a machining aid the metal sulfide composition according to claim 17, said method comprises:

(a) mixing into a blend a desired metal powder with the metal sulfide composition according to claim 17;

(b) spreading the blend into a die shaped for a part to be fabricated;

(c) compacting the blend in the die using a press in forming a compacted part;

(d) sintering the compacted part to increase its metallurgical strength; and (e) machining the sintered part from step (d).

34. The method according to claim 33, wherein the blend further comprises a lubricant, binder, a sintering enhancing additive, and a combination thereof.

35. The method according to claim 34, wherein the metal sulfide composition is added in a weight percentage of from about 0.2% to about 2%.

* * * * *